(12) United States Patent
Ardiff et al.

(10) Patent No.: US 7,993,478 B2
(45) Date of Patent: Aug. 9, 2011

(54) METHOD TO APPLY MULTIPLE COATINGS TO A FIBER WEB

(75) Inventors: Henry G. Ardiff, Chesterfield, VA (US);
Brian D. Arvidson, Chester, VA (US);
Ashok Bhatnagar, Richmond, VA (US);
Lori L. Wagner, Richmond, VA (US);
Duane R. Prior, Richmond, VA (US)

(73) Assignee: Honeywell International, Inc., Morristown, NJ (US)

( * ) Notice: Subject to any disclaimer, the term of this patent is extended or adjusted under 35 U.S.C. 154(b) by 860 days.

(21) Appl. No.: 11/729,257

(22) Filed: Mar. 28, 2007

(65) Prior Publication Data

US 2008/0237911 A1  Oct. 2, 2008

(51) Int. Cl.
*B32B 37/15* (2006.01)
*D04H 3/00* (2006.01)

(52) U.S. Cl. ........ 156/181; 156/230; 156/231; 156/235; 156/247

(58) Field of Classification Search ............... 156/181, 156/230, 231, 235, 246, 247, 289, 344
See application file for complete search history.

(56) References Cited

U.S. PATENT DOCUMENTS

| | | | | |
|---|---|---|---|---|
| 2,965,532 A | * | 12/1960 | Bert | 428/431 |
| 3,434,861 A | * | 3/1969 | Luc | 427/264 |
| 3,796,624 A | * | 3/1974 | Avis et al. | 156/436 |
| 4,495,017 A | * | 1/1985 | Abe et al. | 156/181 |
| 4,510,200 A | | 4/1985 | Samowich | |
| 4,698,110 A | * | 10/1987 | Vassiliou | 156/231 |
| 4,731,143 A | * | 3/1988 | Cross | 156/231 |
| 5,567,498 A | * | 10/1996 | McCarter et al. | 428/113 |
| 6,387,205 B1 | | 5/2002 | Appelt | |
| 6,447,643 B2 | | 9/2002 | Fingal et al. | |

FOREIGN PATENT DOCUMENTS

| | | |
|---|---|---|
| DE | 3817800 | 9/1989 |
| EP | 0658589 | 6/1995 |
| JP | 06278135 | 10/1994 |
| WO | 8906190 | 7/1989 |
| WO | WO 00/48821 | 8/2000 |
| WO | 0214408 | 2/2002 |
| WO | 2006121411 | 11/2006 |

* cited by examiner

*Primary Examiner* — Michael A Tolin

(57) ABSTRACT

A method for applying multiple polymeric coatings onto a fibrous substrate. More particularly, a method for applying multiple polymeric coatings onto fibrous substrates without regard to chemical or physical incompatibilities of the polymeric coating materials. A first polymeric material is applied onto at least one fibrous substrate, and a second polymeric material is applied onto a support. The fibrous substrate and support are joined, contacting the first polymeric material with the second polymeric material, followed by separating the support from the fibrous substrate, such that at least a portion of the second polymeric material remains on the first polymeric material on the fibrous substrate.

16 Claims, 1 Drawing Sheet

METHOD TO APPLY MULTIPLE COATINGS TO A FIBER WEB

BACKGROUND OF THE INVENTION

1. Field of the Invention

The invention relates to the application of multiple polymeric coatings onto a fibrous substrate. More particularly, the invention pertains to the application of multiple different polymeric coatings onto fibrous substrates without regard to chemical or physical incompatibilities of the polymeric coating materials.

2. Description of the Related Art

Developments in the art of fiber-based composites, and particularly in the art of ballistic resistant articles, are being driven by the need for higher performance, increased functionality and lower costs. As materials become more sophisticated and complex, processing techniques do as well. For example, in the ballistic resistant articles industry, ballistic resistant composites are formed high strength fibers which fibers may be encapsulated or embedded in a polymeric binder (polymeric matrix) material to form woven or non-woven fabrics that are either rigid or flexible. These composites display varying degrees of resistance to penetration by high speed impact from projectiles such as bullets, shells, shrapnel and the like.

It is known that the rigidity, impact and ballistic properties of the articles formed from such ballistic resistant composites are affected by the tensile modulus of the binder polymers coating the fibers. For example, U.S. Pat. No. 4,623,574 discloses that fiber reinforced composites constructed with elastomeric matrices having tensile moduli less than about 6000 psi (41,300 kPa) have superior ballistic properties compared both to composites constructed with higher modulus polymers, and also compared to the same fiber structure without one or more coatings of a polymeric binder material. However, low tensile modulus polymeric binder polymers also yield lower rigidity composites. In certain applications, particularly those where a composite must function in both antiballistic and structural modes, there is needed a superior combination of ballistic resistance and rigidity. Further, in addition to these properties, it may be desirable for ballistic resistant fabrics to exhibit good environmental resistance, particularly resistance to dissolution, penetration and/or transpiration by potentially harmful liquids, such as sea water and organic solvents. Unfortunately, few conventional binder materials are capable of providing all the desired properties discussed herein. However, it has been found that the combination of multiple layers of different polymeric materials may combine the beneficial properties of each individual material into a single fabric structure.

In the art, two general coating techniques are used to coat polymeric binder materials onto fibers or fabrics. In one method, a series of fibers are coated or impregnated and then formed into a web. In another method, fibers are first formed into a web or fabric and then coated. However, in some situations, neither method is acceptable for the application of multiple coatings of different materials, particularly when the coatings comprise materials that are incompatible. Accordingly, there is a need in the art to enhance the ability to discreetly apply materials that are physically or chemically incompatible onto fibrous substrates, and to reduce the number of individual steps needed to do so.

The present invention provides a new technique for introducing multiple materials into a fibrous web in one process wherein a polymeric material is transferred from a support to a fibrous substrate that has been pre-coated with another polymeric material. In a preferred embodiment, process of the invention is a hybrid of a specific pan-fed reverse roll coating technique and a particular dip and squeeze technique. Composites fabricated from used each of these coating techniques separately have achieved varying degrees of success. A pan-fed reverse roll coating technique is desirable because there is very tight control of the amount of resin matrix binder that is added to the product. However, applying a liquid binder material onto a dry fibrous web causes spread fibers to constrict into discreet yarn bundles to varying degrees, depending on the yarn characteristics. A dip and squeeze technique is desirable because a liquid binder material is introduced to the fibers before yarn spreading, thereby enhancing the spreading of yarn bundles. However, differences in viscosity, line speed, nip pressure, etc., can cause substantial fluctuations in the amount of liquid picked up by the fibrous web. Additionally, in the formation of unidirectional tapes ("UDT"), which are well known in the art, the UDT has very little strength in the transverse direction, even though it is very strong in the machine direction due to the fiber orientation. Accordingly, the attachment of a release paper (or other support) gives the UDT some transverse strength until it can be formed into a fabric. However, with the dip and squeeze coating technique, the bond of a UDT to the support can be inconsistent and weak and may hinder further processing into a fabric. The proposed hybrid combination of these two methods overcomes the problems associated with the two techniques individually.

Importantly, the process of the invention allows for the application of different polymeric binder materials onto a fibrous substrate to take advantage of the beneficial properties of the different materials. These materials can be applied to the fibers without regard to chemical or physical incompatibilities, and this technique allows for combinations of materials where step-wise introduction would otherwise not be possible. The process is also suitable for applying multiple layers of the same polymeric material onto a substrate.

SUMMARY OF THE INVENTION

The invention provides a method of forming a fibrous composite, which comprises:
a) providing a fibrous substrate, the fibrous substrate having a first polymeric material on a surface thereof;
b) providing a support, the support having a second polymeric material on a surface thereof;
c) thereafter, joining the fibrous substrate and the support by contacting the first polymeric material with the second polymeric material; and then
d) separating the support from the fibrous substrate, such that at least a portion of the second polymeric material remains on the first polymeric material on the fibrous substrate.

The invention also provides a method of forming a fibrous composite, which comprises:
a) providing a plurality of fibrous substrates arranged into an array, wherein each fibrous substrate comprises a single fiber;
b) applying a first polymeric material onto a surface of each fibrous substrate;
c) applying a second polymeric material onto a surface of a support;
d) thereafter, joining the array and the support by contacting the first polymeric material with the second polymeric material;
e) separating the support from the array, such that at least a portion of the second polymeric material remains on the first polymeric material on the fibrous substrates on the first polymeric material;

f) repeating steps a) through e) with at least one additional array of fibrous substrates; and g) thereafter, uniting each array to form a non-woven fabric.

The invention further provides a method of forming a fibrous composite, which comprises:

a) providing a plurality of fibrous substrates, wherein each fibrous substrate comprises a single fiber;

b) applying a first polymeric material onto a surface of each fibrous substrate;

c) applying a second polymeric material onto a surface of a support;

d) thereafter, joining the fibrous substrates and the support by contacting the first polymeric material with the second polymeric material;

e) separating the support from the fibrous substrates, such that at least a portion of the second polymeric material remains on the first polymeric material on the fibrous substrates; and f) thereafter, weaving the fibrous substrates into a woven fabric.

DETAILED DESCRIPTION OF THE INVENTION

Figure 1:
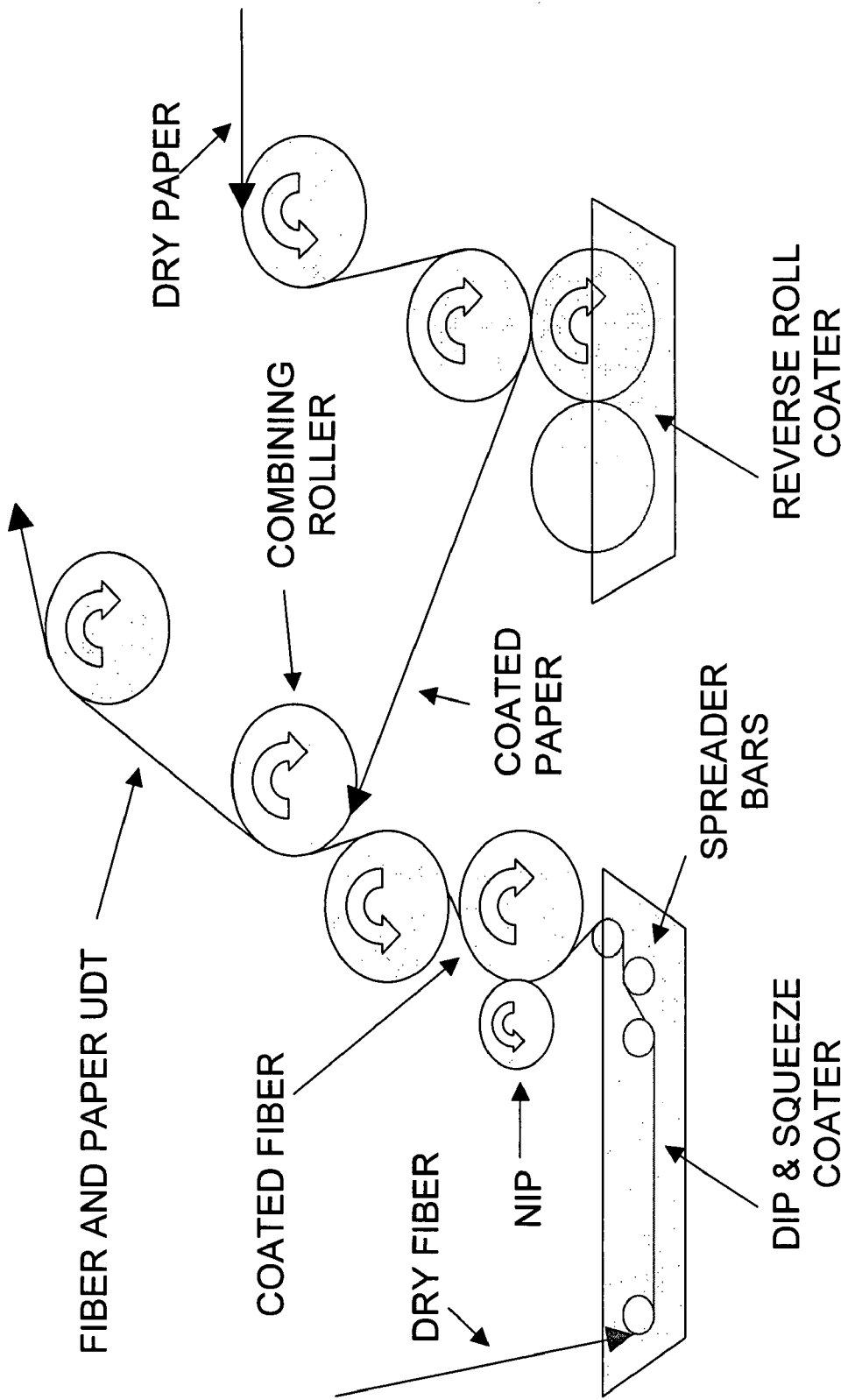
FIG. 1 is a schematic representation illustrating a process for applying a multilayer coating onto a fibrous substrate utilizing a hybrid coating technique.

The invention presents a method for applying multiple polymer layers onto fibrous substrates forming fibrous composites having improved properties. In the inventive method, two separate substrates are independently coated with polymeric materials, followed by mating the two substrates to contact the respective polymeric materials, and thereafter removing one of the substrates. More specifically, one of the substrates is a fibrous material comprising one or more fibers, whereby a first polymer layer comprising the first polymeric material is deposited directly onto a surface of the fibers, and a second polymer layer comprising the second polymeric material is thereafter applied onto the first polymer layer on the fibers.

In accordance with the invention, the first substrate is a fibrous substrate that preferably comprises high strength, high tensile modulus fibers which are useful for the formation of materials and articles having superior ballistic penetration resistance. For the purposes of the invention, materials and articles that have superior ballistic penetration resistance describe those which exhibit excellent properties against high speed projectiles. They also exhibit excellent resistance properties against fragment penetration, such as shrapnel. However, the fibrous substrates of the invention may comprise any fiber type.

The second substrate is a support that may be formed from any type of material that is capable of supporting a polymeric layer on a surface of the support, and capable of transferring at least a portion of the polymeric layer from said support to the fibrous substrate. In one embodiment of the invention, the support may be a process-integrated support that is a component of a processing apparatus, such as a conveyor belt, or may be an independent, single- or multi-use substrate. For example, the support may be a conveyor belt or may be an independent substrate made from polytetrafluoroethylene ("PTFE")-coated fiberglass, silicone-coated fiberglass, PTFE-coated aramid fabric, silicone-coated aramid fabric, PTFE-coated steel, silicone-coated steel, a rubberized fabric, a silicone-coated paper release liner, a silicone-coated polymer film release liner, a polyethylene film, a polypropylene film, a polyester film, a nylon film, a polymethylpentene film or a combination thereof. Other materials not specified herein may also form suitable supports as may be determined by one skilled in the art. As may be deemed necessary, multiple supports may also be employed to carry out the process of the invention. In such a case, the type of material comprising each support will be selected independently from the others, and multiple supports may be used to coat a second polymeric material onto a single fibrous substrate if desired.

Each of the fibrous substrate and the support are independently coated with polymeric materials. For the purposes of the present invention, the term "coated" as used herein is not intended to limit the method by which the polymer layers are applied onto the fibrous substrate surface. Accordingly, the fibrous substrates of the invention and the support may be coated on, impregnated with, embedded in, or otherwise applied with each polymeric material. The polymeric materials may be applied directly to the fiber or fibers of the fibrous substrate and/or to the support using any appropriate method that would be readily determined by one skilled in the art. For example, the polymeric materials may be applied to their respective substrates in solution form by spraying, extruding or roll coating a solution of the polymer material onto fiber surfaces, wherein a portion of the solution comprises the desired polymer or polymers and a portion of the solution comprises a solvent capable of dissolving or dispersing the polymer or polymers, followed by drying. The polymeric materials may be extruded onto their respective substrates using conventionally known techniques, such as through a slot-die, or through other techniques such as direct gravure, Meyer rod and air knife systems, which are well known in the art. Another method is to apply a neat polymer of each coating material to fibers either as a liquid, a sticky solid or particles in suspension or as a fluidized bed. Alternatively, each coating may be applied as a solution, emulsion or dispersion in a suitable solvent which does not adversely affect the properties of fibers at the temperature of application. For example, the fibrous substrate can be transported through a solution of the polymer binder material to substantially coat the substrate with a first polymeric material and then dried to form a coated fibrous substrate. The support may be coated similarly with a second polymeric material.

In another coating technique, each of the fibrous substrate(s) and support may be dipped into a bath of a solution containing the first polymeric material or the second polymeric material dissolved or dispersed in a suitable solvent, and then dried through evaporation or volatilization of the solvent. With respect to the fibrous substrate, this method preferably at least partially coats each individual fiber with the first polymeric material, preferably encapsulating each of the individual fibers or covering all or substantially all of the fiber surface area with the polymer material. The dipping procedure may be repeated several times as required to place a desired amount of polymer material onto the substrate/support.

With particular regard to fibrous substrates, other techniques for applying a coating to the fibers may be used, including coating of the high modulus precursor (gel fiber) before the fibers are subjected to a high temperature stretching operation, either before or after removal of the solvent from the fiber (if using a gel-spinning fiber forming technique). The fiber may then be stretched at elevated temperatures to produce the coated fibers. The gel fiber may be passed through a solution of the appropriate coating polymer under conditions to attain the desired coating. Crystallization of the high molecular weight polymer in the gel fiber may or may not have taken place before the fiber passes into the solution.

Alternatively, the fibers may be extruded into a fluidized bed of an appropriate polymeric powder. Furthermore, if a stretching operation or other manipulative process, e.g. solvent exchanging, drying or the like is conducted, the coating may be applied to a precursor material of the final fibers.

A schematic illustration of a preferred coating technique is provided in FIG. 1 and described in the examples below. This coating technique is a hybrid of conventionally known pan-fed reverse roll coating and dip and squeeze coating techniques which are described in more detail in the examples below. After the fibrous substrate or substrates and the support are each coated with their respective polymeric materials, the substrate/substrates and the support are brought together and joined by contacting the first polymeric material with the second polymeric material. The fibrous substrate and support may be mated manually, by an automated conveyor assembly bringing the two substrates together via a sequence of rollers, or by any other suitable means as would be readily determined by one skilled in the art. After two wet polymer layers are brought together, the assembly is preferably passed through an oven to remove any solvent from the liquid resin materials, resulting in a unidirectional tape anchored to the support (e.g. release paper). Thereafter, the support is separated from the fibrous substrate such that at least a portion of the second polymeric material remains on the first polymeric material on the fibrous substrate.

The support can be removed from the coated fibrous substrate at any number of different times, depending on the mechanical integrity of the coated fibrous substrate or the requirements of downstream processing. For instance, should the coated fibrous web have sufficient integrity after coating and drying, the support can be removed at the exit of the drying oven by means of a nip. At this nip, the fibrous web will be separated from the support and wound on to a core. This separation can be caused by forcing the fibrous web to follow one web path after the nip, while the carrier is forced to follow a second web path. The support, depending on its embodiment, can also be wound on to a core (in the case of a silicone-coated release paper) or can continue back through the coating machine for re-use (as in the case of an integrated conveyor belt). The support may also be removed manually or by any other suitable means as would be readily determined by one skilled in the art. The support can also be left on the fibrous web to assist in subsequent processing and then removed thereafter, such as can be the case with silicone-coated release paper. In some situations, the support can be left as a component of the final fabric, as in the case of an integrated film.

To illustrate the downstream removal of the support, an assembly of unidirectional tape comprising a silicone-coated release paper attached to a unidirectional fibrous web impregnated with two resins is made using the double coating technique described in this invention. Thereafter, this unidirectional tape is dried in the coater's oven. The unidirectional tape is then further processed into a cross-plied non-woven fabric for subsequent evaluation. This processing involves cutting a series of squares from the unidirectional tape, taking two squares, orienting them fiber-side to fiber-side and rotating one of the squares so that the direction of its fibers are perpendicular to the fiber direction of the other square. This is a conventional non-woven 0°/90° configuration used by Honeywell International Inc. to form their well known SPECTRA SHIELD® materials. These pairs of cross-plied squares are then placed into a press where they are pressed together at a temperature of 240° F. (115.6° C.) and a pressure of 100 PSI (689.5 kPa) for 15 minutes. The press is then cooled to room temperature and the pressure released. The squares of fibrous web are now bonded to one another. The silicone-coated release paper is then removed from both sides of this composite by simply pulling the paper (e.g. manually) from the resulting single-layer, non-woven SPECTRA SHIELD® type fabric.

The method of the invention is particularly useful for coating fibrous substrates with a multilayer coating wherein a first polymer layer and a second polymer layer are formed from different polymers which may even be chemically or physically incompatible with each other. This method is also particularly useful when blends of the first polymer and the second polymer are metastable, such that the blended material has a short pot-life. Preferably, the first polymeric material and the second polymeric material are applied to the fibrous substrate(s) and the support, respectively, as liquids. Most preferably the first polymeric material and the second polymeric material are contacted with each other as liquids to facilitate their miscibility and adhesion at their contact interfaces. In other words, the second polymer is preferably contacted with the first polymer as a liquid while the first polymer is wet. Wet application is preferred because it facilitates adhesion of the polymer layers, wherein the individual layers are unified at the surfaces where they contact each other, as polymer molecules from the polymer layers commingle with each other at their contact interfaces and at least partially fuse together. While wetting does not guarantee adhesion, wetting or miscibility is necessary for adhesion. It has been unexpectedly found that "wet on wet" application of dissimilar polymer materials, such as the merging of a fluorine-containing polymer liquid and a non-fluorine-containing polymer liquid, promotes their miscibility and facilitates their adherence to each other.

For the purposes of the invention, a liquid polymer includes polymers that are combined with a solvent or other liquid capable of dissolving or dispersing a polymer, as well as molten polymers and liquid reactive polymer precursors. While any liquid capable of dissolving or dispersing a polymer may be used, preferred groups of solvents include water, paraffin oils and aromatic solvents or hydrocarbon solvents, with illustrative specific solvents including paraffin oil, xylene, toluene, octane, cyclohexane, methyl ethyl ketone (MEK) and acetone. The techniques used to dissolve or disperse the coating polymers in the solvents will be those conventionally used for the coating of similar materials on a variety of substrates.

When the polymeric materials are applied as liquids, the wet polymers may be dried either before separating the support from the fibrous substrates, or after separating the support from the fibrous substrates. Drying most likely occurs after joining the fibrous substrate and the support but before separating the support from the fibrous substrate. However, the polymeric materials could be partially dried between these two steps and completed during or after step separation of the two substrates as long as the polymeric composition allows for cohesion of the fibers. Separate from drying, the polymeric materials may be cured prior to, during or after the fabrication of the ballistic articles. Polymer curing can take place naturally at ambient conditions or can be forced by elevated temperatures at extended times, and is typically conducted at some point after separating the support from the fibrous substrate. Curing timing may be dependent on the type of fabric structure being formed. For example, when forming non-woven fabrics by consolidating a plurality of cross-plied, parallel fiber plies, curing would most likely take place after separating the support from the fibrous substrate, and after cross-plying the component fiber plies. A unidirectional tape (unitape) structure that is not being directly attached to other unitapes prior to consolidation may have its multilayer coating cured prior to, during or after separating the support from the fibrous substrate.

As used herein, a "fiber" is an elongate body the length dimension of which is much greater than the transverse dimensions of width and thickness. The cross-sections of fibers for use in this invention may vary widely. They may be circular, flat or oblong in cross-section. Accordingly, the term fiber includes filaments, ribbons, strips and the like having regular or irregular cross-section. They may also be of irregular or regular multi-lobal cross-section having one or more regular or irregular lobes projecting from the linear or longitudinal axis of the fibers. It is preferred that the fibers are single lobed and have a substantially circular cross-section.

As used herein, a "high-strength, high tensile modulus fiber" is one which has a preferred tenacity of at least about 7 g/denier or more, a preferred tensile modulus of at least about 150 g/denier or more, and preferably an energy-to-break of at least about 8 J/g or more, each as measured by ASTM D2256. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

Particularly suitable high-strength, high tensile modulus fiber materials for the formation of ballistic resistant materials and articles include polyolefin fibers, including high density and low density polyethylene. Particularly preferred are extended chain polyolefin fibers, such as highly oriented, high molecular weight polyethylene fibers, particularly ultra-high molecular weight polyethylene fibers, and polypropylene fibers, particularly ultra-high molecular weight polypropylene fibers. Also suitable are aramid fibers, such as poly(phenylenediamine terephthalamide), particularly para-aramid fibers, polyamide fibers, polyethylene terephthalate fibers, polyethylene naphthalate fibers, extended chain polyvinyl alcohol fibers, extended chain polyacrylonitrile fibers, polybenzazole fibers, such as polybenzoxazole (PBO) and polybenzothiazole (PBT) fibers, liquid crystal copolyester fibers, glass fibers, graphite fibers, and rigid rod fibers such as M5® fibers. Each of these fiber types is conventionally known in the art. Also suitable for producing polymeric fibers are copolymers, block polymers and blends of the above materials.

Preferred fiber types for ballistic resistant fabrics include polyethylene, particularly extended chain polyethylene fibers, aramid fibers, polybenzazole fibers, liquid crystal copolyester fibers, polypropylene fibers, particularly highly oriented extended chain polypropylene fibers, polyvinyl alcohol fibers, polyacrylonitrile fibers and rigid rod fibers, particularly M5® fibers.

In the case of polyethylene, preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,551,296 and 5,006,390, which are also incorporated herein by reference. A preferred fiber type for use in the invention are polyethylene fibers sold under the trademark SPECTRA® from Honeywell International Inc. SPECTRA® fibers are well known in the art and are described, for example, in U.S. Pat. Nos. 4,623,547 and 4,748,064.

Also preferred are aramid (aromatic polyamide) or para-aramid fibers. Such are commercially available and are described, for example, in U.S. Pat. No. 3,671,542. For example, useful poly(p-phenylene terephthalamide) filaments are available commercially from Dupont Corporation under the trademark of KEVLAR®. Also useful in the practice of this invention are poly(m-phenylene isophthalamide) fibers available commercially from Dupont under the trademark NOMEX® and fibers available commercially from Teijin under the trademark TWARON®; aramid fibers available commercially from Kolon Industries, Inc. of Korea under the trademark HERACRON®; p-aramid fibers SVM™ and RUSAR™ which are available commercially from Kamensk Volokno JSC of Russia and ARMOS™ p-aramid fibers available commercially from JSC Chim Volokno of Russia.

Suitable polybenzazole fibers for the practice of this invention are commercially available and are disclosed for example in U.S. Pat. Nos. 5,286,833, 5,296,185, 5,356,584, 5,534,205 and 6,040,050, each of which are incorporated herein by reference. Preferred polybenzazole fibers are ZYLON® brand fibers from Toyobo Co. Suitable liquid crystal copolyester fibers for the practice of this invention are commercially available and are disclosed, for example, in U.S. Pat. Nos. 3,975,487; 4,118,372 and 4,161,470, each of which is incorporated herein by reference.

Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and widely commercially available.

The other suitable fiber types for use in the present invention include rigid rod fibers such as M5® fibers, and combinations of the above materials, all of which are commercially available. For example, the fibrous layers may be formed from a combination of SPECTRA® fibers and Kevlar® fibers. M5® fibers are formed from pyridobisimidazole-2,6-diyl (2,5-dihydroxy-p-phenylene) and are available from Magellan Systems International of Richmond, Va. and are described, for example, in U.S. Pat. Nos. 5,674,969, 5,939,553, 5,945,537, and 6,040,478, each of which is incorporated herein by reference. Specifically preferred fibers include M5® fibers, polyethylene SPECTRA® fibers, aramid Kevlar® fibers and aramid TWARON® fibers.

The fibers may be of any suitable denier, such as, for example, 50 to about 3000 denier, more preferably from about 200 to 3000 denier, still more preferably from about 650 to about 2000 denier, and still more preferably from about 800 to about 1500 denier. The selection is governed by considerations of ballistic effectiveness and cost. Finer fibers are more costly to manufacture and to weave, but can produce greater ballistic effectiveness per unit weight.

Preferred fibers for the purposes of the invention are either high-strength, high tensile modulus extended chain polyethylene fibers or high-strength, high tensile modulus para-aramid fibers. As stated above, a high-strength, high tensile modulus fiber is one which has a preferred tenacity of about 7 g/denier or more, a preferred tensile modulus of about 150 g/denier or more and a preferred energy-to-break of about 8 J/g or more, each as measured by ASTM D2256. In a preferred embodiment of the invention, the tenacity of the fibers should be about 15 g/denier or more, preferably about 20 g/denier or more, more preferably about 25 g/denier or more and still more preferably about 30 g/denier or more. The fibers of the invention also have a preferred tensile modulus of about 300 g/denier or more, more preferably about 400 g/denier or more, more preferably about 500 g/denier or more, more preferably about 1,000 g/denier or more and still more preferably about 1,500 g/denier or more. The fibers of the invention also have a preferred energy-to-break of about 15 J/g or more, more preferably about 25 J/g or more, more preferably about 30 J/g or more and still more preferably have an energy-to-break of about 40 J/g or more.

These combined high strength properties are obtainable by employing well known processes. U.S. Pat. Nos. 4,413,110, 4,440,711, 4,535,027, 4,457,985, 4,623,547 4,650,710 and 4,748,064 generally discuss the formation of preferred high strength, extended chain polyethylene fibers employed in the present invention. Such methods, including solution grown or gel fiber processes, are well known in the art. Methods of forming each of the other preferred fiber types, including para-aramid fibers, are also conventionally known in the art, and the fibers are commercially available.

As referenced herein, a fibrous substrate is considered to be a single fiber in most embodiments, but may alternately be considered a fabric when a plurality of fibers are united as a monolithic structure prior to application of the first polymeric material, such as with a woven fabric that comprises a plurality of woven fibers. The method of the invention may also be conducted where the fibrous substrate comprises a plurality of fibers that are arranged as a fiber web or other multi-fiber arrangement that is not technically considered to be a fabric at the time of coating. This embodiment is described herein as coating a first polymeric material onto a plurality of fibrous substrates. Thus, the step of joining the fibrous substrate and the support comprises merging the support with the plurality of fibrous substrates. When a plurality of fibers are present, each fiber may be coated sequentially or consecutively with the first polymeric material, and thereafter coated sequentially or consecutively with the second polymeric material. In one preferred embodiment of the invention, the first polymeric material is applied onto either a woven fabric or a plurality of individual fibers that are arranged in a fiber web to form a coated web. The fibers of a coated fiber web will thereafter be divided into a plurality of non-woven fiber plies for the formation of a non-woven fabric, or will be woven into a fabric. Alternately, a first polymeric material may be applied onto at least one non-woven array of fibers that is not part of a fiber web. It should be understood that non-woven fabrics are formed by merging a plurality of fibers with one or more polymeric binder materials. Accordingly, the fibrous substrate typically will not be a non-woven fabric, but rather an arrangement of fibers serving as a pre-cursor to a non-woven fabric. However, as is the case with woven fabric substrates, non-woven fabrics may be coated using this method to apply additional protective polymeric materials onto one or more surfaces of the fabric.

One or both of the first polymeric material and/or second polymeric material may function as a binder material that binds a plurality of fibers together by way of its adhesive characteristics or after being subjected to well known heat and/or pressure conditions. This type of polymeric binder material is also referred to in the art as a polymeric matrix material. As stated above, the method of the invention is particularly useful for coating fibrous substrates with a multilayer coating wherein a first polymer layer and a second polymer layer are formed from different polymers which may even be chemically or physically incompatible with each other. It has been found that the process of the invention is particularly useful where one of the first or second polymeric material comprises a fluorine-containing polymer and the other polymeric material comprises a non-fluorine-containing polymer that is conventionally used as a polymeric matrix material in the art of ballistic resistant composites.

As used herein, a "fluorine-containing" polymeric material describes a material formed from at least one polymer that includes fluorine atoms. Such include fluoropolymers and/or fluorocarbon-containing materials, i.e. fluorocarbon resins.

A "fluorocarbon resin" generally refers to polymers including fluorocarbon groups. Fluorine-containing materials, particularly fluoropolymers and fluorocarbon resin materials, are commonly known for their excellent chemical resistance and moisture barrier properties. Particularly, fluorine-containing polymers are desirable in other arts due to their resistance to dissolution, penetration and/or transpiration by sea water and resistance to dissolution, penetration and/or transpiration by one or more organic solvents, such as diesel gasoline, non-diesel gasoline, gun lube, petroleum and organic solvents derived from petroleum. In the art of ballistic resistant materials, fluorine-containing coatings advantageously contribute to the retention of the ballistic resistance properties of a fabric after prolonged exposure to potentially harmful liquids.

Importantly, when fluorine-containing polymers are applied onto high strength, ballistic resistant fibers together with another conventional polymer matrix material that is conventionally used in the art of ballistic resistant fabrics, the ballistic performance of a ballistic resistant composite formed therefrom is substantially retained after the composite is immersed in either water, e.g. salt water, or gasoline. More specifically, it has been found that fabrics including fibers coated with a layer of a fluorine-containing polymer and a separately applied layer of a conventional, non-fluorine-containing matrix polymer have a significantly improved $V_{50}$ retention % after immersion in either salt water or gasoline, i.e. greater than 90% retention as illustrated in the inventive examples, compared to fabrics formed with only non-fluorine-containing polymeric materials. Such materials also have a significantly reduced tendency to absorb either salt water or gasoline compared to fabrics formed without a fluorine-containing polymer layer, as the fluorine-containing polymer serves as a barrier between individual filaments, fibers and/or fabrics and salt water or gasoline.

Useful fluoropolymer and fluorocarbon resin materials herein include fluoropolymer homopolymers, fluoropolymer copolymers or blends thereof as are well known in the art and are described in, for example, U.S. Pat. Nos. 4,510,301, 4,544,721 and 5,139,878. Examples of useful fluoropolymers include, but are not limited to, homopolymers and copolymers of chlorotrifluoroethylene, ethylene-chlorotrifluoroethylene copolymers, ethylene-tetrafluoroethylene copolymers, fluorinated ethylene-propylene copolymers, perfluoroalkoxyethylene, polychlorotrifluoroethylene, polytetrafluoroethylene, polyvinyl fluoride, polyvinylidene fluoride, and copolymers and blends thereof.

As used herein, copolymers include polymers having two or more monomer components. Preferred fluoropolymers include homopolymers and copolymers of polychlorotrifluoroethylene. Particularly preferred are PCTFE polychlorotrifluoroethylene (PCTFE) homopolymer materials sold under the ACLON™ trademark and which are commercially available from Honeywell International Inc. of Morristown, N.J.

The most preferred fluoropolymers or fluorocarbon resins include fluorocarbon-modified polymers, particularly fluorooligomers and fluoropolymers formed by grafting fluorocarbon side-chains onto conventional polyethers (i.e. fluorocarbon-modified polyethers), polyesters (i.e. fluorocarbon-modified polyesters), polyanions (i.e. fluorocarbon-modified polyanions) such as polyacrylic acid (i.e. fluorocarbon-modified polyacrylic acid) or polyacrylates (i.e. fluorocarbon-modified polyacrylates), and polyurethanes (i.e. fluorocarbon-modified polyurethanes). These fluorocarbon side chains or perfluoro compounds are generally produced by a telomerisation process and are referred to as $C_8$ fluorocarbons. For example, a fluoropolymer or fluorocarbon resin may be derived from the telomerisation of an unsaturated fluorocompound, forming a fluorotelomer, where said fluorotelomer is further modified to allow reaction with a polyether, polyester, polyanion, polyacrylic acid, polyacrylate or polyurethane, and where the fluorotelomer is then grafted onto a polyether, polyester, polyanion, polyacrylic acid, polyacrylate or polyurethane. Good representative examples of these fluorocarbon-containing polymers are NUVA® fluoropolymer products, commercially available from Clariant International, Ltd. of Switzerland. Other fluorocarbon resins, fluorooligomers and fluoropolymers having perfluoro acid-based and perfluoro alcohol-based side chains are also most preferred. Fluoropolymers and fluorocarbon resins having fluorocarbon side chains of shorter lengths, such as $C_6$, $C_4$ or $C_2$, are also suitable, such as POLYFOX™ fluorochemicals, commercially available from Omnova Solutions, Inc. of Fairlawn, Ohio.

A fluorine-containing polymeric material may also comprise a combination of a fluoropolymer or a fluorocarbon-containing material with another polymer, including blends with conventional polymeric binder materials described herein. In one preferred embodiment, a polymer material comprising a fluorine-containing polymer is a blend of a fluorine-containing polymer and an acrylic polymer. Preferred acrylic polymers non-exclusively include acrylic acid esters, particularly acrylic acid esters derived from monomers such as methyl acrylate, ethyl acrylate, n-propyl acrylate, 2-propyl acrylate, n-butyl acrylate, 2-butyl acrylate and tert-butyl acrylate, hexyl acrylate, octyl acrylate and 2-ethylhexyl acrylate. Preferred acrylic polymers also particularly include methacrylic acid esters derived from monomers such as methyl methacrylate, ethyl methacrylate, n-propyl methacrylate, 2-propyl methacrylate, n-butyl methacrylate, 2-butyl methacrylate, tert-butyl methacrylate, hexyl methacrylate, octyl methacrylate and 2-ethylhexyl methacrylate. Copolymers and terpolymers made from any of these constituent monomers are also preferred, along with those also incorporating acrylamide, n-methylol acrylamide, acrylonitrile, methacrylonitrile, acrylic acid and maleic anhydride. Also suitable are modified acrylic polymers modified with nonacrylic monomers. For example, acrylic copolymers and acrylic terpolymers incorporating suitable vinyl monomers such as: (a) olefins, including ethylene, propylene and isobutylene; (b) styrene, N-vinylpyrrolidone and vinylpyridine; (c) vinyl ethers, including vinyl methyl ether, vinyl ethyl ether and vinyl n-butyl ether; (d) vinyl esters of aliphatic carboxylic acids, including vinyl acetate, vinyl propionate, vinyl butyrate, vinyl laurate and vinyl decanoates; and (e) vinyl halides, including vinyl chloride, vinylidene chloride, ethylene dichloride and propenyl chloride. Vinyl monomers which are likewise suitable are maleic acid diesters and fumaric acid diesters, in particular of monohydric alkanols having 2 to 10 carbon atoms, preferably 3 to 8 carbon atoms, including dibutyl maleate, dihexyl maleate, dioctyl maleate, dibutyl fumarate, dihexyl fumarate and dioctyl fumarate.

Acrylic polymers and copolymers are preferred because of their inherent hydrolytic stability, which is due to the straight carbon backbone of these polymers. Acrylic polymers are also preferred because of the wide range of physical properties available in commercially produced materials. The range of physical properties available in acrylic resins matches, and perhaps exceeds, the range of physical properties thought to be desirable in polymeric binder materials of ballistic resistant composite matrix resins.

As referenced herein, conventional polymeric matrix materials, i.e. polymeric binder materials, include a wide variety of materials. Such include both low modulus, elastomeric materials and high modulus, rigid materials. Preferred low modulus, elastomeric materials are those having an initial tensile modulus less than about 6,000 psi (41.3 MPa), and preferred high modulus, rigid materials are those having an initial tensile modulus at least about 100,000 psi (689.5 MPa), each as measured at 37° C. by ASTM D638. As used herein throughout, the term tensile modulus means the modulus of elasticity as measured by ASTM 2256 for a fiber and by ASTM D638 for a polymeric binder material.

An elastomeric polymeric binder material may comprise a variety of materials. A preferred elastomeric binder material comprises a low modulus elastomeric material. For the purposes of this invention, a low modulus elastomeric material has a tensile modulus, measured at about 6,000 psi (41.4 MPa) or less according to ASTM D638 testing procedures. Preferably, the tensile modulus of the elastomer is about 4,000 psi (27.6 MPa) or less, more preferably about 2400 psi (16.5 MPa) or less, more preferably 1200 psi (8.23 MPa) or less, and still more preferably is about 500 psi (3.45 MPa) or less. The glass transition temperature (Tg) of the elastomer is preferably about 0° C. or less, more preferably the about −40° C. or less, and still more preferably about −50° C. or less. The elastomer also has a preferred elongation to break of at least about 50%, more preferably at least about 100% and still more preferably has an elongation to break of at least about 300%.

A wide variety of materials and formulations having a low modulus may be utilized as a non-fluorine-containing polymeric binder material. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, silicone elastomers, copolymers of ethylene, and combinations thereof, and other low modulus polymers and copolymers. Also preferred are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R\text{-}(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. The most preferred low modulus polymeric binder materials comprise styrenic block copolymers, particularly polystyrene-polyisoprene-polystrene-block copolymers, sold under the trademark KRATON® commercially produced by Kraton Polymers and HYCAR® T122 acrylic resins commercially available from Noveon, Inc. of Cleveland, Ohio.

Preferred high modulus, rigid polymers useful as the first polymeric material or the second polymeric material include materials such as a vinyl ester polymer or a styrene-butadiene block copolymer, and also mixtures of polymers such as vinyl ester and diallyl phthalate or phenol formaldehyde and polyvinyl butyral. A particularly preferred high modulus material is a thermosetting polymer, preferably soluble in carbon-carbon saturated solvents such as methyl ethyl ketone, and possessing a high tensile modulus when cured of at least about $1\times10^5$ psi (689.5 MPa) as measured by ASTM D638. Particularly preferred rigid materials are those described in U.S. Pat. No. 6,642,159, which is incorporated herein by reference.

In a preferred embodiment of the invention, either the first polymeric material, the second polymeric material, or both, comprises a polyurethane polymer, a polyether polymer, a polyester polymer, a polycarbonate resin, a polyacetal polymer, a polyamide polymer, a polybutylene polymer, an ethylene-vinyl acetate copolymer, an ethylene-vinyl alcohol copolymer, an ionomer, a styrene-isoprene copolymer, a styrene-butadiene copolymer, a styrene-ethylene/butylene copolymer, a styrene-ethylene/propylene copolymer, a polymethyl pentene polymer, a hydrogenated styrene-ethylene/butylene copolymer, a maleic anhydride functionalized styrene-ethylene/butylene copolymer, a carboxylic acid functionalized styrene-ethylenelbutylene copolymer, an acrylonitrile polymer, an acrylonitrile butadiene styrene copolymer, a polypropylene polymer, a polypropylene copolymer, an epoxy resin, a novolac resin, a phenolic resin, a vinyl ester resin, a silicone resin, a nitrile rubber polymer, a natural rubber polymer, a cellulose acetate butyrate polymer, a polyvinyl butyral polymer, an acrylic polymer, an acrylic copolymer or an acrylic copolymer incorporating non-acrylic monomers.

It is known that fluorine-containing polymer layers can be difficult to adhere to non-fluorine-containing polymer layers. In general, fluorine-containing solid surfaces are difficult to wet or adhere with a non-fluorine containing liquid. This can be an issue when attempting to coat fibers that are already coated with a fluorine-containing finish with a conventional liquid matrix resin. In other arts, it is known to use special intermediate adhesive tie layers to attach the dissimilar layers, but such adhesive tie layers are undesirable for use in ballistic resistant composites as they may detrimentally affect the properties of the composites. However, it has been found that the unique methods of this invention may be used to facilitate the attachment of dissimilar polymeric matrix materials onto fibers without using an adhesive tie layer. Particularly, it has been found that wet fluorine-containing liquids and wet non-fluorine-containing liquids are miscible and will wet each other when they are brought together per the technique of the invention. Accordingly, such wet dissimilar materials may be applied onto a fiber surface and be effectively adhered to each other and to the surface of a fibrous substrate.

While this process is particularly well suited for attaching layers of different, dissimilar polymeric materials, it is just as well suited for attaching layers that are similar, compatible or identical polymeric materials. For example, both of the first polymeric material and the second polymeric material may comprise a fluorine-containing polymeric binder or both may comprise non-fluorine-containing polymers. The process of the invention may also be repeated to apply additional polymeric layers of any polymeric material onto the second polymeric material. The additional polymer layers may be attached by direct application onto the second polymeric material (or the last polymer layer of a higher number), or by transferring another polymer material onto the second polymeric material from a support.

The most appropriate type of polymer forming each of the first polymeric material and second polymeric will vary depending on the type of article to be formed from the fabrics of the invention. In order to achieve a compromise in both properties, a polymeric material may comprise a blend of both low modulus and high modulus materials for use as a first polymer layer, second polymer layer or as any additional polymer layer. Each polymer layer may also include fillers such as carbon black or silica, may be extended with oils, or may be vulcanized by sulfur, peroxide, metal oxide or radiation cure systems if appropriate, as is well known in the art.

When coating a plurality of individual fibers, after the multiple coatings are applied onto the fibrous substrate(s), the resulting multilayer coated fiber(s) is(are) then arranged into the desired fabric configuration. A plurality of the multilayer coated fibers may be formed into non-woven fabrics using techniques that are well known in the art, and optionally consolidated thereafter. For example, non-woven fabrics may be formed which comprise a plurality of overlapping, non-woven fibrous plies that are consolidated into a single-layer, monolithic element. In this embodiment, each ply comprises an arrangement of non-overlapping fibers that are aligned in a unidirectional, substantially parallel array. This type of fiber arrangement is known in the art as a "unitape" or a "unidirectional tape" and is also referred to herein as a "single ply". As used herein, an "array" describes an orderly arrangement of fibers or yarns, and a "parallel array" describes an orderly parallel arrangement of fibers or yarns. A fiber "layer" describes a planar arrangement of woven or non-woven fibers or yarns including one or more plies. As used herein, a "single-layer" structure refers to monolithic structure composed of one or more individual fiber plies that have been consolidated into a single unitary structure. By "consolidating" it is meant that the multilayer polymeric binder coating together with each fiber ply are combined into a single unitary layer. Consolidation can occur via drying, cooling, heating, pressure or a combination thereof. The term "composite" refers to combinations of fibers with the multilayer polymeric binder material. Such is conventionally known in the art.

A preferred non-woven fabric structure includes a plurality of stacked, overlapping fiber plies (plurality of unitapes) wherein the parallel fibers of each single ply (unitape) are positioned orthogonally (0°/90°) to the parallel fibers of each adjacent single ply relative to the longitudinal fiber direction of each single ply. The stack of overlapping non-woven fiber plies is consolidated under heat and pressure, or by adhering the polymeric resin coatings of individual fiber plies, to form a single-layer, monolithic element which has also been referred to in the art as a single-layer, consolidated network where a "consolidated network" describes a consolidated (merged) combination of fiber plies with a polymeric binder material. The terms "polymeric binder material" and "polymeric matrix material" are used interchangeably herein, and describe a material that binds fibers together after the application of well known heat and/or pressure conditions or through adhesion of the polymer. These terms are conventionally known in the art, and refer to both of the first polymer material and second polymer material described herein.

As is conventionally known in the art, excellent ballistic resistance is achieved when individual fiber plies are cross-plied such that the fiber alignment direction of one ply is rotated at an angle with respect to the fiber alignment direction of another ply. Most preferably, fiber plies are cross-plied orthogonally at 0° and 90° angles, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,573; and 4,737,402.

Most typically, non-woven fabrics include from 1 to about 6 plies, but may include as many as about 10 to about 20 plies as may be desired for various applications. Each ply is preferably formed from fibers coated with multiple polymeric materials using the methods described herein. The greater the number of plies translates into greater ballistic resistance, but also greater weight.

Accordingly, the number of fiber plies forming a fabric or an article of the invention varies depending upon the ultimate use of the fabric or article. For example, in body armor vests for military applications, in order to form an article composite that achieves a desired 1.0 pound per square foot areal density (4.9 kg/m$^2$), a total of at 22 individual plies may be required, wherein the plies may be woven, knitted, felted or non-woven fabrics (with parallel oriented fibers or other arrangements) formed from the high-strength fibers described herein. In another embodiment, body armor vests for law enforcement use may have a number of plies based on the National Institute of Justice (NIJ) Threat Level. For example, for an NIJ Threat Level IIIA vest, there may also be a total of 22 plies. For a lower NIJ Threat Level, fewer plies may be employed.

Further, the fiber plies of the invention may alternately comprise yarns rather than fibers, where a "yarn" is a strand consisting of multiple fibers or filaments. Alternately, non-woven fiber plies may be formed that comprise other fiber arrangements, such as felted structures which are formed using conventionally known techniques, comprising fibers in random orientation instead of parallel arrays. Articles of the invention may also comprise combinations of woven fabrics, non-woven fabrics formed from unidirectional fiber plies and non-woven felt fabrics. Consolidated non-woven fabrics may be constructed using well known methods, such as by the methods described in U.S. Pat. No. 6,642,159, the disclosure of which is incorporated herein by reference.

As is well known in the art, consolidation is done by positioning the individual fiber plies on one another under conditions of sufficient heat and pressure to cause the plies to combine into a unitary fabric. Consolidation may be done at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that the polymeric binder coatings can be caused to stick or flow without completely melting. However, generally, if the polymeric binder materials are caused to melt, relatively little pressure is required to form the composite, while if the binder materials are only heated to a sticking point, more pressure is typically required. Consolidation may also be achieved by a wet lamination of the first fibrous web to the second fibrous web without requiring heat and/or pressure. As is conventionally known in the art, consolidation may be conducted in a calender set, a flat-bed laminator, a press or in an autoclave.

Alternately, consolidation may be achieved by molding under heat and pressure in a suitable molding apparatus. Generally, molding is conducted at a pressure of from about 50 psi (344.7 kPa) to about 5000 psi (34470 kPa), more preferably about 100 psi (689.5 kPa) to about 1500 psi (10340 kPa), still more preferably from about 150 psi (1034 kPa) to about 1000 psi (6895 kPa). Molding may alternately be conducted at higher pressures of from about 500 psi (3447 kPa) to about 5000 psi, more preferably from about 750 psi (5171 kPa) to about 5000 psi and more preferably from about 1000 psi to about 5000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. (~149° C.) and still more preferably at a temperature from about 200° F. to about 280° F. (~121° C.). The pressure under which the fabrics of the invention are molded has a direct effect on the stiffness or flexibility of the resulting molded product. Particularly, the higher the pressure at which the fabrics are molded, the higher the stiffness, and vice-versa. In addition to the molding pressure, the quantity, thickness and composition of the fabric plies and polymeric binder coating types also directly affects the stiffness of the articles formed from the inventive fabrics.

While each of the molding and consolidation techniques described herein are similar, each process is different. Particularly, molding is a batch process and consolidation is a continuous process. Further, molding typically involves the use of a mold, such as a shaped mold or a match-die mold when forming a flat panel, and does not necessarily result in a planar product. Normally consolidation is done in a flat-bed laminator, a calendar nip set or as a wet lamination to produce soft body armor fabrics. Molding is typically reserved for the manufacture of hard armor, e.g. rigid plates. In the context of the present invention, consolidation techniques and the formation of soft body armor are preferred.

In either process, suitable temperatures, pressures and times are generally dependent on the type of polymeric binder coating materials, polymeric binder content (of the combined coatings), process used and fiber type. The fabrics formed herein may optionally be calendered under heat and pressure to smooth or polish their surfaces. Calendering methods are well known in the art.

Woven fabrics may be formed from the coated fibrous substrates after separating the support from the fibrous substrate using techniques that are well known in the art using any fabric weave, such as plain weave, crowfoot weave, basket weave, satin weave, twill weave and the like. Plain weave is most common, where fibers are woven together in an orthogonal 0°/90° orientation. In another embodiment, a hybrid structure may be assembled where one both woven and non-woven fabrics are combined and interconnected, such as by consolidation.

To produce a fabric article having sufficient ballistic resistance properties, the proportion of fibers forming the fabric preferably comprises from about 50% to about 98% by weight of the fibers plus the weight of the combined polymeric coatings, more preferably from about 70% to about 95%, and still more preferably from about 78% to about 90% by weight of the fibers plus the combined polymeric coatings. Thus, the total weight of the combined polymeric coatings preferably comprises from about 2% to about 50% by weight of the fabric, more preferably from about 5% to about 30% and still more preferably from about 10% to about 22% by weight of the fabric, wherein about 16% is most preferred.

The thickness of the individual fabrics will correspond to the thickness of the individual fibers together with the thickness of the combined polymeric coatings. A preferred woven fabric will have a preferred thickness of from about 25 µm to about 500 µm per layer, more preferably from about 50 µm to about 385 µm and still more preferably from about 75 µm to about 255 µm per layer. A preferred non-woven fabric, i.e. a non-woven, single-layer, consolidated network, will have a preferred thickness of from about 12 µm to about 500 µm, more preferably from about 50 µm to about 385 µm and still more preferably from about 75 µm to about 255 µm, wherein a single-layer, consolidated network typically includes two consolidated plies (i.e. two unitapes). While such thicknesses are preferred, it is to be understood that other thicknesses may be produced to satisfy a particular need and yet fall within the scope of the present invention.

Preferred ballistic resistant fabrics formed herein will have a preferred areal density of from about 50 grams/m$^2$ (gsm) (0.01 lb/ft$^2$ (psf)) to about 1000 gsm (0.2 psf). More preferable areal densities for the fabrics of this invention will range from about 70 gsm (0.014 psf) to about 500 gsm (0.1 psf). One preferred areal density for fabrics of this invention will range from about 100 gsm (0.02 psf) to about 250 gsm (0.05 psf). The articles of the invention, which consist of multiple individual layers of fabric stacked one upon the other, will further have a preferred areal density of from about 1000 gsm (0.2 psf) to about 40,000 gsm (8.0 psf), more-preferably from about 2000 gsm (0.40 psf) to about 30,000 gsm (6.0 psf), more preferably from about 3000 gsm (0.60 psf) to about 20,000 gsm (4.0 psf), and still more preferably from about 3750 gsm (0.75 psf) to about 10,000 gsm (2.0 psf).

The composites of the invention may be used in various applications to form a variety of different ballistic resistant articles using well known techniques. Various ballistic resistant constructions and suitable formation techniques are known and described, for example, in U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference. The composites are particularly useful for the formation of flexible, soft armor articles, including garments such as vests, pants, hats, or other articles of clothing, and covers or blankets, used by military personnel to defeat a number of ballistic threats, such as 9 mm full metal jacket (FMJ) bullets and a variety of fragments generated due to explosion of handgrenades, artillery shells, Improvised Explosive Devices (IED) and other such devises encountered in a military and peace keeping missions. As used herein, "soft" or "flexible" armor is armor that does not retain its shape when subjected to a significant amount of stress and is incapable of being freestanding without collapsing. The composites are also useful for the formation of rigid, hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. Fabric composites can be cut into a plurality of discrete sheets and stacked for formation into an article or they can be formed into a precursor which is subsequently used to form an article. Such techniques are well known in the art.

Garments may be formed from the composites of the invention through methods conventionally known in the art. Preferably, a garment may be formed by adjoining the ballistic resistant fabric composites of the invention with an article of clothing. For example, a vest may comprise a generic fabric vest that is adjoined with the ballistic resistant composites of the invention, whereby the inventive composites are inserted into strategically placed pockets. This allows for the maximization of ballistic protection, while minimizing the weight of the vest. As used herein, the terms "adjoining" or "adjoined" are intended to include attaching, such as by sewing or adhering and the like, as well as un-attached coupling or juxtaposition with another fabric, such that the ballistic resistant materials may optionally be easily removable from the vest or other article of clothing. Articles used in forming flexible structures like flexible sheets, vests and other garments are preferably formed from using a low tensile modulus binder material for the non-fluorine-containing polymer layer. Hard articles like helmets and armor are preferably formed using a high tensile modulus binder material for the non-fluorine-containing polymer layer.

Ballistic resistance properties are determined using standard testing procedures that are well known in the art. Particularly, the protective power or penetration resistance of a ballistic resistant composite is normally expressed by citing the impacting velocity at which 50% of the projectiles penetrate the composite while 50% are stopped by the shield, also known as the $V_{50}$ value. As used herein, the "penetration resistance" of an article is the resistance to penetration by a designated threat, such as physical objects including bullets, fragments, shrapnel and the like, and non-physical objects, such as a blast from explosion. For composites of equal areal density, which is the weight of the composite divided by its area, the higher the $V_{50}$, the better the ballistic resistance of the composite. The ballistic resistant properties of the articles of the invention will vary depending on many factors, particularly the type of fibers used to manufacture the fabrics, the percent by weight of the fibers in the composite, the suitability of the physical properties of the matrix materials, the number of layers of fabric making up the composite and the total areal density of the composite. However, the use of one or more polymeric coatings that are resistant to dissolution or penetration by sea water, and resistant to dissolution or penetration by one or more organic solvents, does not negatively affect the ballistic properties of the articles of the invention.

While the present invention has been primarily described with reference to the formation of ballistic resistant end products utilizing high strength, high tensile modulus fibers and particular polymeric matrix materials, it should be understood that the method of the invention is universally acceptable for other composite industries. It may be utilized in the production of fibrous materials for other industries that require the application of multiple polymeric coatings onto fiber or fabric substrates, without regard to the particular materials characterizing the fibrous substrate(s), the support or the polymeric coating materials.

The following examples serve to illustrate the invention:

EXAMPLE 1

A silicone-coated release paper support was coated with a polymeric binder material that was a water-based resin dispersion of a synthetic styrene-isoprene-styrene (SIS) block copolymer (PRINLIN™ B7137AL commercially available from Henkel Technologies of Düsseldorf, Germany) using a standard pan-fed reverse roll coating method. The polymeric binder material was applied at full strength as supplied by the manufacturer.

Separately, a fibrous web comprising aramid yarns (Twaron® 1000-denier, type 2000 yarns, commercially available from Teijin Twaron BV of The Netherlands) was coated with a dilution of said resin dispersion having a lower concentration of PRINLIN™ B7137AL (900% dilution with de-ionized water, resulting in a 10% dispersion of the material) in a yarn impregnator using a dip and squeeze technique.

In the pan-fed reverse roll coating method, a high precision metering roller and a high precision application roller were positioned in parallel at a pre-determined fixed distance from each other. Each roller has approximately the same physical dimensions. The rollers were held at the same elevation and their bottoms were submerged in a liquid resin bath of the polymeric binder material contained in a pan. The metering roller was held stationary while the applicator roller rotated in a direction that would lift some of the liquid in the resin bath towards the gap between the rollers. Only the amount of liquid that will fit through this gap is carried to the upper surface of the applicator roll, and any excess falls back into the resin bath.

Concurrently, the support was carried towards the upper surface of the applicator roll, with its direction of travel being opposite to the direction the upper surface of the rotating applicator roll. When the support was directly above the applicator roll, it was pressed onto the upper surface of the applicator roller by means of a backing roller. All of the liquid that was carried by the upper surface of the applicator roller was then transferred to the support. This technique was used to apply a precisely metered amount of liquid resin to the surface of the silicone-coated release paper.

The dip and squeeze technique was conducted to coat the fibrous web with the diluted resin dispersion using the following steps:

1. Spools of Twaron® fibers were unwound from a creel.
2. The fibers were sent through a though a series of combs, which caused the fibers to be evenly spaced and parallel to each other. At this point, the individual fibers were closely positioned and parallel to one another in a fibrous web, i.e. a substantially parallel array.
3. The fibrous web was then passed over a series of rotating idler rollers that redirected the substantially parallel array down and through the liquid resin bath. In this bath, each of the fibers were completely submerged into the liquid for a length of time sufficient to cause the liquid to penetrate each and wet the individual filaments.
4. At the end of this liquid resin bath, the wetted fibrous web was pulled over a series of stationary (non-rotating) spreader bars. The spreader bars spread out the individual fibers until they abutted or overlapped with their neighbors.
5. Once the wetted fibrous web passed over the last spreader bar, it was again re-directed, this time up and out of the liquid. This wetted fibrous web then was wrapped around a large rotating idler roller. The fibrous web carried with it an excess of the liquid.
6. In order to remove this excess liquid from the fibrous web, another freely rotating idler roller was positioned to ride on the surface of the large rotating idler roller. These two idler rollers were parallel to each other and the freely rotating idler roller was mounted in such a way that it beared down on the large rotating idler roller in a radial direction, effectively forming a nip. The wetted fibrous web was carried through this nip and the force applied by the freely rotating idler roller acted to squeeze off the excess liquid, which ran back into the liquid resin bath.

The liquid resin matrix binder wicks or absorbs through the dry fibrous web via capillary action. The wetted (impregnated) fibrous web was then cast onto the silicone-coated release paper. A preferred method for conducting the process of the invention is described in below and illustrated in FIG. 1. The assembly was then passed through an oven to remove the solvent from the liquid resin materials, resulting in a unidirectional tape anchored to the release paper. An additional UDT was produced by repeating the above process steps. The two UDTs were then cross-plied and consolidated to form a non-woven fabric. Overall, a roll of UDT made using this hybrid coating technique was of very good quality. The fiber spread was good, the amount of resin added to the fibrous web was very consistent and the UDT was anchored down to the silicone-coated release paper well enough to allow further processing.

This hybrid method is superior to standard pan-fed reverse roll coating or dip and squeeze coating alone. Pan-fed reverse roll coating alone is undesirable because fibers are spread when dry and when the dry fibrous web is mated with the wet coated substrate, the spread filaments resist wetting and reform into discreet fiber bundles. This degrades the spread and uniformity of the fibrous web. Dip and Squeeze coating alone is undesirable because differences in viscosity, line speed, nip pressure, etc., can cause substantial fluctuations in the amount of liquid picked up by a fibrous web. The amount of resin added to the fibrous web is not controllable as it is with the pan-fed reverse roll coating technique. Further, since the fibrous web is coated and not the silicone-coated paper, the bond of the UDT to the silicone-coated release paper can be inconsistent and weak, which hinders further processing. A combination of the two techniques overcame these disadvantages.

COMPARATIVE EXAMPLES 1 AND 2

For comparison, two Comparative Examples were conducted by repeating the techniques of Example 1 but by varying the coating materials applied by each technique of the hybrid process as summarized in Table 1:

TABLE 1

| EXAMPLE | Roll Coater | Dip & Squeeze |
| --- | --- | --- |
| Inventive Example #1 | PRINLIN ™ B7137AL | 10% PRINLIN ™ B7137AL dilution |
| Comparative Example #1 | PRINLIN ™ B7137AL | None |
| Comparative Example #2 | None | PRINLIN ™ B7137AL |

In Comparative Example #1, we observed that although the resin content in the UDT was very consistent, the quality of the spread of the fiber was poor. In Comparative Example #2, the spread of the fiber was very good, but the resin content in the UDT varied throughout the run. In Inventive Example #1, the UDT was of good quality, with the fiber spread being good, the resin content added to the fibrous web very consistently and the UDT was anchored down to the silicone-coated release paper well enough to allow further processing. The results are summarized in Table 2 below:

TABLE 2

| EXAMPLE | Roll Coater | Dip & Squeeze | Spread | Resin Content | Adhesion |
| --- | --- | --- | --- | --- | --- |
| Inventive Example #1 | PRINLIN™ B7137AL | 10% PRINLIN™ B7137AL | Good | Good | Good |
| Comparative Example #1 | PRINLIN™ B7137AL | None | Poor | Good | Good |
| Comparative Example #2 | None | PRINLIN™ B7137AL | Good | Variable | Variable |

It is evident from these results that the concurrent use of two distinct coating techniques achieved a result that was not possible with either one of the coating techniques alone.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A method of forming a fibrous composite, which comprises:
    a) providing a fibrous substrate comprising an array of fibers, the array of fibers having a first liquid polymeric material on a surface thereof;
    b) providing a support, the support having a second liquid polymeric material on a surface thereof;
    c) thereafter, joining the array of fibers and the support by contacting the first polymeric material with the second polymeric material; and then
    d) separating the support from the array of fibers, such that at least a portion of the second polymeric material remains on the first polymeric material on the array of fibers;
    wherein
    the first polymeric material and the second polymeric material are dried after step c) but prior to step d);
    or the first polymeric material and the second polymeric material are dried after step d).

2. The method of claim 1 wherein step a) comprises applying the first polymeric material onto the array of fibers, and wherein step b) comprises the step of applying the second polymeric material onto the support.

3. The method of claim 1 further comprising forming the array of fibers into a fabric after step d).

4. The method of claim 3 wherein said fabric comprises a non-woven fabric.

5. The method of claim 3 further comprising forming a ballistic resistant article from said fabric.

6. The method of claim 1 wherein each fiber of said array of fibers has a tenacity of about 7 g/denier or more and a tensile modulus of about 150 g/denier or more.

7. The method of claim 1 wherein said array of fibers comprises one or more polyolefin fibers, aramid fibers, polybenzazole fibers, polyvinyl alcohol fibers, polyamide fibers, polyethylene terephthalate fibers, polyethylene naphthalate fibers, polyacrylonitrile fibers, liquid crystal copolyester fibers, rigid rod fibers comprising pyridobisimidazole-2,6-diyl (2,5-dihydroxy-p-phenylene), or a combination thereof.

8. The method of claim 1 wherein said support comprises a polytetrafluoroethylene-coated fiberglass, silicone-coated fiberglass, polytetrafluoroethylene-coated aramid fabric, silicone-coated aramid fabric, polytetrafluoroethylene-coated steel, silicone-coated steel, a rubberized fabric, a silicone-coated paper release liner, a silicone-coated polymer film release liner, a polyethylene film, a polypropylene film, a polyester film, a nylon film, a polymethylpentene film or a combination thereof.

9. The method of claim 1 wherein said support comprises a conveyor belt.

10. The method of claim 1 wherein said first polymeric material and said second polymeric material are different and are chemically incompatible.

11. The method of claim 1 further comprising repeating steps b) through d) at least once to apply at least one additional polymeric material onto the array of fibers.

12. The method of claim 1 wherein step a) comprises applying the first polymeric material onto the array of fibers as a liquid, and wherein step b) comprises applying the second polymeric material onto the support as a liquid, and wherein the first polymeric material and the second polymeric material are dried after step c) but prior to step d).

13. The method of claim 1 wherein step a) further comprises applying the first polymeric material onto at least one array of fibers as a liquid, and wherein step b) comprises applying the second polymeric material onto at least one support as a liquid, and wherein the first polymeric material and the second polymeric material are dried after step d).

14. The method of claim 1 which further comprises:
    repeating steps a) through d) with at least one additional array of fibers;
    and thereafter, uniting each array of fibers to form a non-woven fabric.

15. The method of claim 1 further comprising spreading apart the fibers of said array of fibers prior to step c), wherein step c) is conducted on said spread apart fibers and further comprising forming the plurality of fibers into a fabric after step d).

16. The method of claim 14 further comprising spreading apart the fibers of said array of fibers prior to step d), wherein step d) is conducted on said spread apart fibers.

* * * * *